(12) United States Patent
Collmer et al.

(10) Patent No.: US 9,290,079 B2
(45) Date of Patent: Mar. 22, 2016

(54) VEHICLE HEATER

(75) Inventors: Andreas Collmer, Aichwald (DE); Michael Haefner, Stuttgart (DE)

(73) Assignee: Eberspaecher Climate Control Systems GmbH & Co. KG, Esslingen am Neckar (DE)

( * ) Notice: Subject to any disclaimer, the term of this patent is extended or adjusted under 35 U.S.C. 154(b) by 720 days.

(21) Appl. No.: 13/546,467

(22) Filed: Jul. 11, 2012

(65) Prior Publication Data

US 2013/0015255 A1   Jan. 17, 2013

(30) Foreign Application Priority Data

Jul. 12, 2011 (DE) .......................... 10 2011 079 018

(51) Int. Cl.
  *B60H 1/22* (2006.01)
  *F23C 3/00* (2006.01)
  *F23M 9/10* (2006.01)
  (Continued)

(52) U.S. Cl.
  CPC ................ *B60H 1/2212* (2013.01); *F23C 3/00* (2013.01); *F23M 9/10* (2013.01); *B60H 1/00264* (2013.01); *B60H 2001/2271* (2013.01);
  (Continued)

(58) Field of Classification Search
  CPC ........... B60H 1/00592; B60H 1/00264; B60H 1/2212; B60H 2201/2271; B60H 2201/2278; B60H 1/0025; F23C 3/00; F23D 2900/21002; F23D 2900/03006; F24H 6/065; F23M 9/10
  USPC .............. 431/8, 185; 237/32, 12.3 R, 12.3 A, 237/12.3 C, 12.7, 45
  See application file for complete search history.

(56) References Cited

U.S. PATENT DOCUMENTS 3,989,029 A * 11/1976 Friedl ...................... B60H 1/22
                                                      126/110 B
3,989,030 A * 11/1976 Friedl ........................ 126/110 R
(Continued)

FOREIGN PATENT DOCUMENTS

CN    200982741 Y    11/2007
CN    201297768 Y    8/2009
(Continued)

OTHER PUBLICATIONS

"DE_102005001662_A1 Google Translate.pdf", Machine translation, http://www.google.com, Feb. 21, 2014.*
(Continued)

*Primary Examiner* — Gregory Huson
*Assistant Examiner* — Daniel E Namay
(74) *Attorney, Agent, or Firm* — McGlew and Tuttle, P.C.

(57) ABSTRACT

A vehicle heater includes a burner arrangement (12) with a flame tube (16), a heat exchanger housing (18) with a circumferential wall (20), which surrounds the flame tube and thus defines a waste gas backflow space (26) and has a waste gas outlet (38) from the waste gas backflow space. A flow cross section provided between the flame tube and the circumferential wall in a first axial area (33) of the waste gas backflow space is smaller in an outlet area (48) than in an opposite area (50) located opposite the outlet and the flow cross section in the outlet area increases in an expansion area following the first axial area. The flow cross section in a second axial area (35) following the expansion area (52), corresponds essentially to the flow cross section in the opposite area and/or the flow cross section has a stepped increase in the expansion area.

20 Claims, 2 Drawing Sheets

(51) Int. Cl.
*F24H 3/06* (2006.01)
*F24H 3/08* (2006.01)
*B60H 1/00* (2006.01)

(52) U.S. Cl.
CPC .............. *F23C 2900/03006* (2013.01); *F23D 2900/11403* (2013.01); *F23D 2900/21002* (2013.01)

(56) References Cited

U.S. PATENT DOCUMENTS

| | | | |
|---|---|---|---|
| 4,216,759 A | 8/1980 | Friedl et al. | |
| 4,590,888 A * | 5/1986 | Mosig | 122/149 |
| 4,624,218 A * | 11/1986 | Bauml | B60H 1/2209 |
| | | | 122/136 C |
| 4,637,371 A | 1/1987 | Rathel | |
| 4,640,262 A * | 2/1987 | Lucius | 126/110 B |
| 4,923,033 A * | 5/1990 | Panick et al. | 181/211 |
| 5,056,501 A * | 10/1991 | Ida | 126/110 B |
| 5,738,506 A * | 4/1998 | Mosig et al. | 431/90 |
| 6,743,012 B2 * | 6/2004 | Wolf | B60H 1/2212 |
| | | | 165/41 |
| 6,926,206 B2 * | 8/2005 | Schlecht | B60H 1/2212 |
| | | | 165/41 |
| 7,380,728 B2 * | 6/2008 | Augenstein | B60H 1/038 |
| | | | 165/41 |
| 7,434,746 B2 * | 10/2008 | Schlecht et al. | 237/12.3 C |
| 8,910,881 B2 * | 12/2014 | Ludwig | 237/12.3 A |
| 2002/0117551 A1 * | 8/2002 | Wolf | B60H 1/2212 |
| | | | 237/12.3 C |
| 2003/0173413 A1 * | 9/2003 | Schlecht et al. | 237/12.3 C |
| 2005/0260530 A1 * | 11/2005 | Schlecht et al. | 431/261 |
| 2006/0151623 A1 * | 7/2006 | Haefner et al. | 237/12.3 C |
| 2008/0128525 A1 * | 6/2008 | Ludwig | B60H 1/2212 |
| | | | 237/12.3 A |

FOREIGN PATENT DOCUMENTS

| | | | |
|---|---|---|---|
| CN | 102080874 A | 6/2011 | |
| DE | 2718215 A1 | 11/1978 | |
| DE | 33 41 490 A1 | 5/1985 | |
| DE | 4401800 C1 * | 3/1995 | F23D 3/40 |
| DE | 4433210 A1 * | 3/1996 | B60H 1/22 |
| DE | 19546131 C1 * | 11/1996 | B60H 1/2203 |
| DE | 197 34 814 C1 | 1/1999 | |
| DE | 199 26 264 A1 | 12/2000 | |
| DE | 199 29 465 C1 | 3/2001 | |
| DE | 10211591 A1 * | 10/2003 | B60H 1/22 |
| DE | 10 2005 001 662 A1 | 7/2006 | |
| DE | 10 2009 049 781 A1 | 4/2011 | |
| DE | 10 2009 046 781 A1 | 5/2011 | |
| EP | 769399 A2 * | 4/1997 | B60H 1/22 |
| EP | 1752708 A2 * | 2/2007 | |
| EP | 1970233 A1 * | 9/2008 | B60H 1/22 |
| JP | 61188216 A * | 8/1986 | B60H 1/22 |
| JP | 62293087 A * | 12/1987 | |
| JP | 02208405 A * | 8/1990 | F23D 3/40 |
| JP | 03070939 A * | 3/1991 | |

OTHER PUBLICATIONS

European Search Report of Nov. 2, 2015.

* cited by examiner

VEHICLE HEATER

CROSS REFERENCE TO RELATED APPLICATIONS

This application claims the benefit of priority under 35 U.S.C. §119 of German Patent Application DE 10 2011 079 018.7 filed Jul. 12, 2011, the entire contents of which are incorporated herein by reference.

FIELD OF THE INVENTION

The present invention pertains to a vehicle heater, comprising a burner arrangement with a flame tube, which carries combustion waste gases away from a combustion chamber and extends elongated in the direction of a longitudinal axis, as well as a heat exchanger housing with a circumferential wall, which surrounds the flame tube and thus defines a waste gas backflow space extending essentially in a ring-like pattern about the longitudinal axis and with a bottom area located opposite a waste gas outlet end area of the flame tube, wherein a waste gas outlet for releasing the combustion waste gases from the waste gas backflow space is provided in an outlet circumferential area of the heat exchanger housing.

BACKGROUND OF THE INVENTION

Such a vehicle heater is known from DE 10 2005 001 662 A1. The hot combustion waste gases leaving the flame tube at the outlet end area thereof are deflected outwardly in the radial direction in relation to the longitudinal axis by the bottom area of the heat exchanger body, which said bottom area is located opposite said outlet end area and enter the backflow space in an inlet area, which is formed between an outer circumferential surface of the flame tube in the outlet end area thereof and the radially opposite inner circumferential surface of the circumferential wall of the heat exchanger housing. The circumferential wall of the heat exchanger housing is expanded in a stepped manner in an expansion area following said inlet area. Beginning with this expansion area, heat transfer ribs are provided on the inside of the heat exchanger housing or of the circumferential wall of said heat exchanger housing, which inside faces the flame tube, in order to transfer the heat being transported in the combustion waste gases to the circumferential wall to a greater extent. The flame tube is also expanded in a stepped manner in the area of the stepped expansion of the circumferential wall of the heat exchanger housing, and both the flame tube and the circumferential wall are made rotationally essentially symmetrical in relation to the longitudinal axis, i.e., they have the same circumferential expansion in all circumferential areas or have the same radial distance from the longitudinal axis.

DE 199 26 264 A1 discloses a vehicle heater, in which the bottom area of the heat exchanger housing is made asymmetric to homogenize the flow of the combustion waste gases in the waste gas backflow space. A calotte-like bulge, which should cause the combustion waste gases leaving the flame tube to flow into the waste gas backflow space to a greater extent or preferably in this area instead of necessarily following the shortest flow path in the outlet circumferential area, is present in an area located diametrically opposite the waste gas outlet.

DE 197 34 814 C1 discloses a vehicle heater, in which the flame tube is arranged eccentrically in relation to the circumferential wall of the heat exchanger housing due to the fact that the height of heat exchange ribs provided on an inside of the heat exchanger housing changes over the circumference. Thus, a smaller volume is made available for the flow through the combustion waste gases in the area of the circumference in which the outlet is provided due to the shorter radial distance present between the circumferential wall of the heat exchanger housing and the flame tube.

SUMMARY OF THE INVENTION

An object of the present invention is to provide a vehicle heater, in which improved transfer of the heat being transported in combustion waste gases to a heat exchanger housing is achieved.

This object is accomplished according to the present invention by a vehicle heater, comprising a burner arrangement with a flame tube, which carries combustion waste gases away from a combustion chamber and extends elongated in the direction of a longitudinal axis, as well as a heat exchanger housing with a circumferential wall, which surrounds the flame tube and thus defines a waste gas backflow space extending essentially in a ring-like pattern around the longitudinal axis and with a bottom area, which is located opposite a waste gas outlet end area of the flame tube, wherein a waste gas outlet is provided in an outlet circumferential area of the heat exchanger housing for releasing the combustion waste gases from the waste gas backflow space.

Provisions are, furthermore, made for a flow cross section made available in the outlet circumferential area between the flame tube and the circumferential wall to be smaller in a first axial area of the waste gas backflow space than in a circumferential area located opposite the outlet circumferential area in relation to the longitudinal axis and for the flow cross section to increase in the outlet circumferential area in an expansion area following the first axial area, wherein the flow cross section in the outlet circumferential area essentially corresponds in a second axial area following the expansion area to the flow cross section in the opposite circumferential area, or/and wherein the flow cross section increases in a stepped manner in the expansion area.

The fact that the flow behavior of the hot combustion waste gases leaving the flame tube is not the same in all circumferential areas is taken into account by the present invention. The combustion waste gases flow, in principle, preferably into the area in which the waste gas outlet can be reached with the lowest flow resistance. This is, in general, the flow path along which the shortest flow path is also present between the outlet end area of the flame tube and the waste gas outlet. Since the flow cross section is smaller in the design according to the present invention in the circumferential area in which the waste gas outlet is located than in a circumferential area that is located opposite in relation to the longitudinal axis and is consequently located farthest away from the waste gas outlet in the circumferential direction, and an increased flow resistance is consequently generated in the outlet circumferential area by providing a throttling effect, the combustion waste gases are also routed to a greater extent in the direction of the opposite circumferential area and flow there towards the waste gas outlet in the direction away from the outlet end area. A more uniform flow distribution is thus achieved over the entire circumference of the flame tube or the ring-shaped waste gas backflow space, so that the heat can be transmitted more uniformly distributed to the heat exchanger housing in the circumferential direction. However, since the flow cross section is expanded following the first axial area, and this expansion is a stepped expansion or such an expansion that approximately equal flow conditions are made available in a second axial section following now at the two circumferential areas located diametrically opposite each other in relation to the longitudinal axis, an approximately uniform heat transfer characteristic can be obtained distributed over the circumference especially in the longitudinal section of the waste gas backflow space now following the expansion area in the direction of flow.

It should be pointed out that in the sense of the present invention, the statement that the flow cross section has a certain value in certain circumferential areas shall be defined such that the flow cross section area available per unit of circumference for the combustion waste gases is set in a defined manner. For example, such a unit of circumference could be represented by the opening angle or the circumferential extension of the waste gas outlet in relation to the longitudinal axis. Any other unit of circumference, measured, for example, at an angle in relation to the longitudinal axis, could, of course also be used for the corresponding comparison.

To ensure that a comparatively high flow resistance is, in principle, provided where the flow path between the outlet end area and the waste gas outlet is shortest and the combustion waste gases are thus also forced into other circumference areas, it is proposed that the flow cross section be smallest in the outlet circumferential area in relation to other circumferential areas.

Provisions may be made, for example, for the flow cross section to be represented by a radial distance between an outer circumferential surface of the flame tube and an inner circumferential surface of the circumferential wall. It becomes apparent here in connection with the above definition of the flow cross section that the flow cross section is smaller in comparable angle segments of the waste gas backflow space extending in a ring-like pattern about the longitudinal axis where the radial distance between the outer circumferential surface of the flame tube and the inner circumferential surface of the circumferential wall is smallest and is largest in the area or in the angle segments where this radial distance is greatest.

A further homogenization of the flow in the circumferential direction can be achieved by the flow cross section in the outlet circumferential area being smaller in a backflow space inlet area formed between the outlet end area of the flame tube and the circumferential wall than in the circumferential area located opposite. It is ensured in this design that a comparatively high flow resistance is present at first in the outlet circumferential area at the time of entry into the waste gas backflow space, so that the combustion waste gases leaving the flame tube are also forced to flow into other circumferential areas. However, homogenization of the flow cross section can take place in essential longitudinal areas of the waste gas backflow space that now follow in the direction of flow in order to then make it possible to obtain uniform flow conditions in the circumferential direction.

This can be achieved, for example, by a radial distance between an outer circumferential surface of the flame tube and an inner circumferential surface of the circumferential wall increasing in a stepped manner in the expansion area.

A design symmetrical in the circumferential direction especially in the areas located closer to the waste gas outlet can then be obtained by the radial distance between the outer circumferential surface of the flame tube and the inner circumferential surface of the circumferential wall being essentially equal in areas located opposite each other in relation to the longitudinal axis following the expansion area in the direction of the waste gas outlet.

To make it possible to further improve the heat transfer to the heat exchanger housing, it is proposed that heat transfer ribs extending preferably in the axial direction be provided on an inside of the heat exchanger housing facing the flame tube.

Utilizing the presence of such heat transfer ribs, the flow cross section can be influenced in different circumferential areas in another advantageous embodiment by a circumferential distance between adjacent heat transfer ribs being smaller in the axial area in the outlet circumferential area than in the opposite circumferential area.

To make it possible to obtain flow conditions adapting to each other in the direction of the waste gas outlet in this embodiment as well, it is proposed that the circumferential distance between adjacent heat transfer ribs increase in the expansion area in the outlet circumferential area to a circumferential distance corresponding to the circumferential distance in the opposite circumferential area.

Consequently, the flow cross section is represented in this embodiment variant by the circumferential distance between adjacent heat transfer rings, which distance can be influenced, on the one hand, by the geometry of the ribs, i.e., for example the thickness of said ribs, but is also influenced, on the other hand, by the number of ribs. For example, the number of ribs provided, e.g., with equal thickness, could thus be greater in the outlet circumferential area than in the opposite circumferential area, which likewise leads—relative to a unit of circumference—to a smaller flow cross section in the outlet circumferential area.

It should be pointed out that it is, of course, also possible to achieve the two aspects of influencing the flow cross section discussed above by changing or presetting the radial distance between the outer circumferential surface of the flame tube and the inner circumferential surface of the circumferential wall and by influencing the circumferential distance of the heat transfer ribs. This ultimately means that the flow cross section will now vary both due to a change in the radial distance and due to a change in the circumferential distance between the outlet circumferential area and the opposite circumferential area.

It is proposed, furthermore, for providing a design that can also be embodied in a simple manner in conjunction with other assembly units of the vehicle heater that the flame tube and the heat exchanger housing be arranged essentially concentrically with the longitudinal axis.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED
EMBODIMENTS

Figure 1:
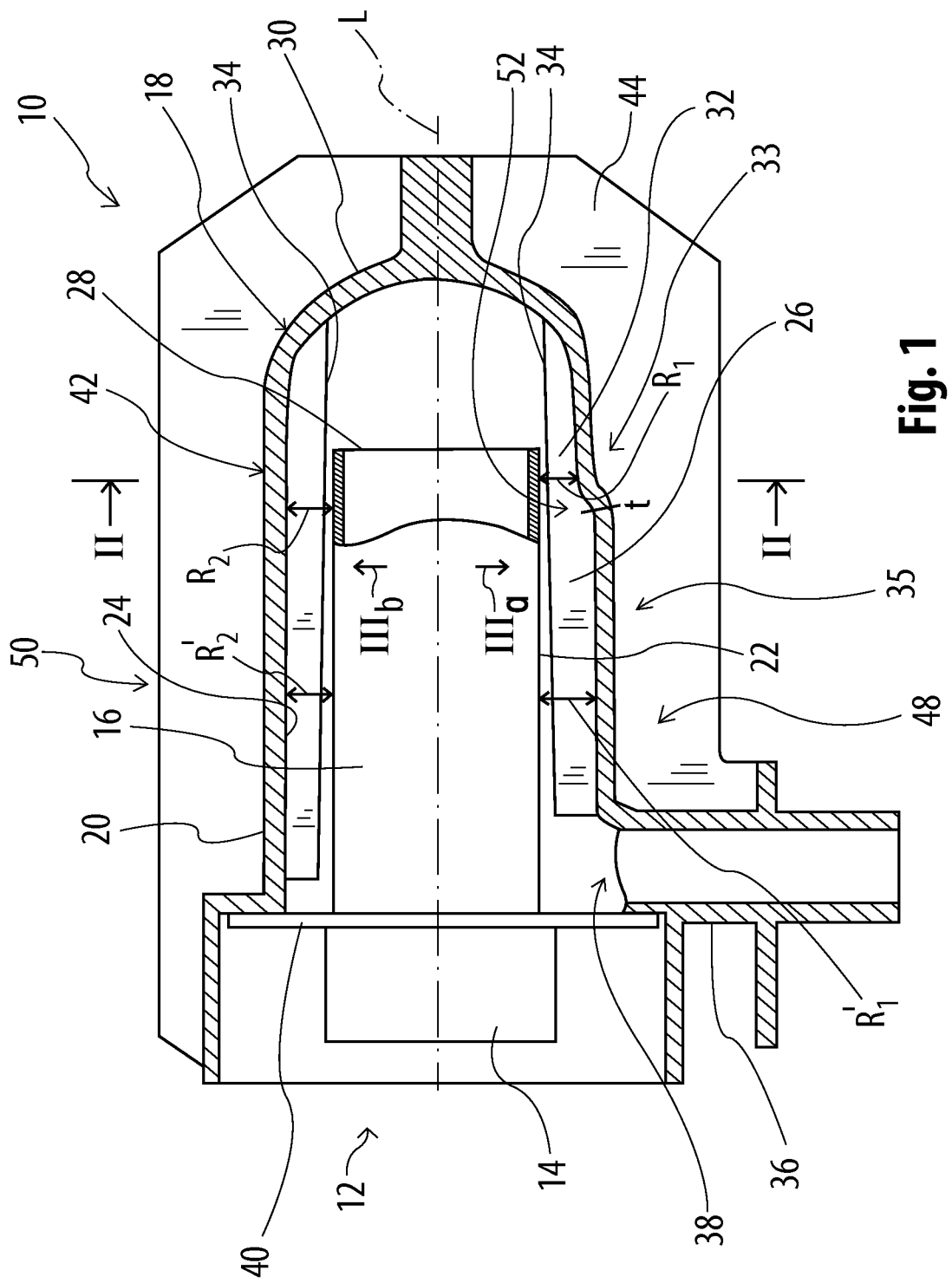
FIG. 1 is a longitudinal sectional view of a vehicle heater.

Referring to the drawings in particular, FIG. 1 shows a longitudinal section along a longitudinal axis L of a vehicle heater 10, which may be used, for example, as a parking heater or auxiliary heater in a vehicle. Vehicle heater 10 comprises a burner area 12, for example, an evaporative burner, to which fuel and combustion air are fed and are burned as a mixture in a combustion chamber 14. The combustion waste gases formed during the combustion leave the combustion chamber 14 and enter a flame tube 16, which has, for example, an essentially cylindrical shape extending elongated in the direction of longitudinal axis L. The longitudinal axis L may define here, for example, a central axis of flame tube 16.

A heat exchanger housing generally designated by 18 surrounds with a circumferential wall 20 the flame tube 16, so that a waste gas backflow space 26 extending generally in a ring-like pattern (annularly) is formed between an outer circumferential surface 22 of flame tube 16 and an inner circumferential surface 24 of the circumferential wall 20 or of the heat exchanger housing 18.

Heat exchanger housing 18 comprises, furthermore, a bottom area 30, which adjoins the circumferential wall 20 and is located axially opposite an outlet end area 28 of flame tube 16. Flame tube 16 is open, for example, axially at the outlet end area 28, so that the combustion waste gases leaving the flame tube 16 there flow in the direction of the bottom area 30 and are deflected outwardly in the radial direction there. The combustion waste gases thus deflected reach an inlet area 32 of the waste gas backflow space 26 defined between the outer circumferential surface 22 at the outlet end area 28 and the radially opposite inner circumferential surface 24 and flow, also sent through heat transfer ribs 34 provided on an inside of the heat exchanger housing 18 and at the inner circumferential surface 24 of the circumferential wall 20 and extending, for example, in the direction of the longitudinal axis L, in the direction of a waste gas outlet 36 formed in the area of an outlet pipe 38. This waste gas outlet 36 is provided close to a closing wall 40 axially defining the waste gas backflow space 26 in the axial direction.

During the flow from the inlet area 32 to the outlet 38, the hot combustion waste gases transfer heat to the heat transfer ribs 34 and the inner circumferential surface 24 and also the bottom area 30 of the heat exchanger housing 18. Further heat transfer ribs 44, via the surface of which the heat absorbed in the heat exchanger housing 18 is transferred, for example, to the air, which is to be introduced into the interior space of a vehicle and flows around the heat exchanger housing 18, for example, in the direction of longitudinal axis L, may be provided on the outside 42 of said heat exchanger housing, which said outside is located such that it faces away from the flame tube 16.

Figure 2:
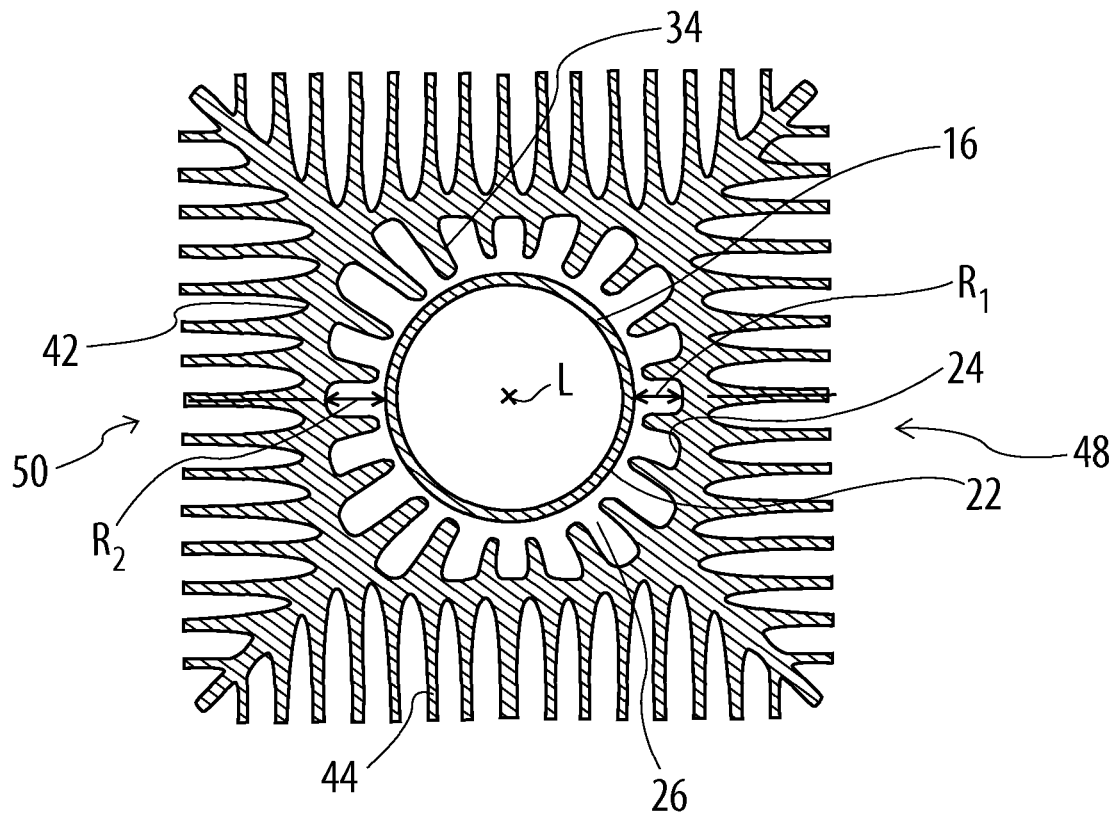
FIG. 2 is a cross-sectional view of the vehicle heater according to FIG. 1, cut along a line II-II in FIG. 1.

It is recognized from the views in FIGS. 1 and 2 that a radial distance R1 between the outer circumferential surface 22 and the inner circumferential surface 24 is smaller in the inlet area 32 of the waste gas backflow space 26, which said inlet area provides a first axial area 33, and in an outlet circumferential area 48, than a corresponding radial distance R2 in a circumferential area 50 located diametrically opposite the outlet circumferential area 48 in relation to the longitudinal axis L. The outlet circumferential area 48 is the circumferential area in which the waste gas outlet 36 and the outlet pipe 38 are provided at the heat exchanger housing 18, and the combustion waste gases thus leave the waste gas backflow space 26 after flowing through same. The consequence of this different radial distance is that the flow cross section is smaller in the outlet circumferential area 48 than in the opposite circumferential area 50.

As was shown already in the introduction, the flow cross section may be related here to a circumferential extension of the waste gas backflow space 26 extending, in general, in a ring-like pattern around the longitudinal axis L, which circumferential extension is defined, for example, as an angle segment. It is achieved as a consequence of this flow cross section or radial distance between the outer circumferential surface 22 and the inner circumferential surface 24, which said flow cross section or radial distance varies in the circumferential direction, that the flowing waste gases, which leave the outlet end area 28 and are deflected at the bottom area 30, also flow to a greater extent into the inlet area 32 of the waste gas backflow space 26 in the opposite circumferential area 50, because a throttling effect t and hence an increased flow resistance is produced by the shorter radial distance R1 in the outlet circumferential area 48. This means that not only can the hot combustion waste gases take the shortest flow path between the outlet end area 28 and outlet 38, namely, the direct flow in the outlet circumferential area 48, but a more uniform distribution can also take place over the circumference. Provisions may be made for this purpose, for example, for the radial distance R1 in the outlet circumferential area 48 to be the shortest radial distance between the outer circumferential surface 22 and the inner circumferential surface 24 in relation to all other circumferential areas. Depending on the embodiment of the circumferential wall 20, the radial distance may be varied, in principle, for example, with a continuous increase from the outlet circumferential area 48 to the opposite circumferential area 50 between the outlet circumferential area 48 and the opposite circumferential area 50 if the inner circumferential surface 24 has a circular ring shape just as the outer circumferential surface 22. The radial distance between the outlet circumferential area 48 and the opposite circumferential area 50 increases and decreases several times in the case of the approximately square cross-sectional geometry of the inner circumferential surface 24 shown in FIG. 2. However, the radial distance R1 at the outlet circumferential area 48 is smaller than the radial distance R2 at the opposite circumferential area 50 in this case as well and is also smaller than at all other circumferential areas. However, the radial distance R2 at the opposite circumferential area 50 is not necessarily also the greatest radial distance between the outer circumferential surface 22 and the inner circumferential surface 24.

FIG. 1 shows, furthermore, that the radial distance between the outer circumferential surface 22 and the inner circumferential surface 24 in relation to the longitudinal axis L increases in an expansion area 52 located close to the inlet area 32 at a step-like expansion of the circumferential wall 20. This increase may be preferably such that a radial distance R1', which is equal to the radial distance R2' present in the same axial area in the opposite circumferential area 50, is present in the outlet circumferential area 48 in a second axial area 35 now following the expansion area 52. This means that following the expansion area 52 axially in the direction of flow, the radial distances are essentially equal in all circumferential areas located diametrically opposite each other in relation to the longitudinal axis L, and the variation in the circumferential direction, which can likewise be recognized from FIG. 2 and is due to the geometry of the circumferential wall 20 and/or of the flame tube 16, may be present. The radial distance may now remain axially constant or even increase in the axial direction axially following the expansion area 52 in the direction of flow.

Figure 3A:
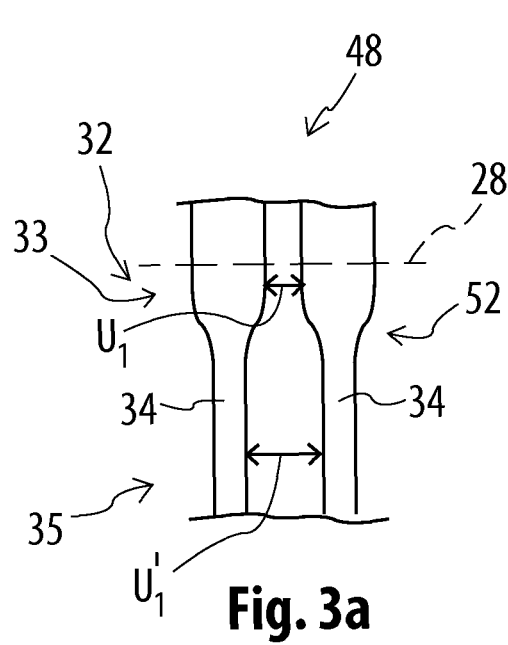
FIG. 3a is a view of a heat exchanger body on the inside taken from the radial direction IIIa of FIG. 1.
Figure 3B:
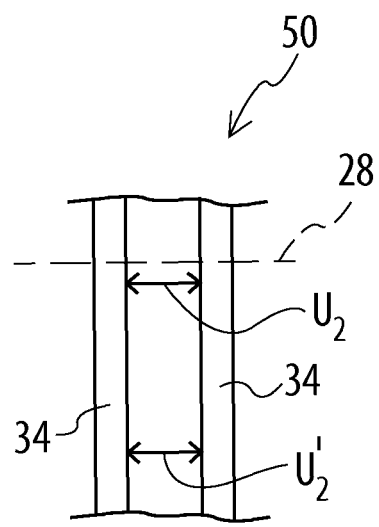
FIG. 3b is a view of a heat exchanger body on the inside taken from the radial direction IIIb of FIG. 1.

A variation, with which flow throttling can also be achieved in the outlet circumferential area 48, is shown in the views of FIG. 3a and FIG. 3b. FIG. 3a shows heat transfer ribs 34, which are arranged in the outlet circumferential area 48, whereas FIG. 3b shows heat transfer ribs 34 that are arranged in the opposite circumferential area 50. The axial end of flame tube 16, i.e., the waste gas outlet end area 28 of said flame tube, is indicated by respective broken lines. It is seen that the circumferential distance U1 is shorter in the inlet area 32 of the waste gas backflow space 26 in case of the heat transfer ribs 34 positioned in the outlet circumferential area 48 than a circumferential distance U2 that is provided in the same axial area in case of the heat transfer ribs 34 provided at the opposite circumferential area 50. This causes that, again in relation to a certain circumferential area or a unit of circumference, the flow cross section in the outlet circumferential area 48 is also smaller in case of a possibly equal radial distance between the outer circumferential surface 22 and the inner circumferential surface 24 than in the opposite circumferential area.

It should be pointed out here that the term "circumferential distance" is defined here as the distance actually present between the surfaces of the heat transfer ribs 34, which surfaces are located facing each other. The circumferential distance of, for example, longitudinal center lines of the individual heat transfer ribs 34 may now be equally distributed over the entire circumference.

It is seen from FIG. 3 that this variation of the circumferential distance is achieved by the heat transfer ribs 34 being broader in the circumferential direction, i.e., thicker in the outlet circumferential area 48 than the heat transfer ribs 34 provided in the opposite circumferential area 50. The thickness of the heat transfer ribs 34 provided in the outlet circumferential area 48 may decrease in an expansion area 52 in an area now following in the direction of flow, so that a circumferential distance U1' is now present there, which distance corresponds to the circumferential distance U2' of the heat transfer ribs 34 provided in the opposite circumferential area 50, which latter distance is present at the same axial position. This may again correspond, for example, to the circumferential distance U2.

It is apparent that the variation aspect shown in FIG. 3 may be combined with the variation aspect of the radial contraction, which is shown in FIGS. 1 and 2. It is also obvious that the constriction, contraction of the circumference or throttling effect may be provided by varying the number of heat transfer ribs 34 present per unit of circumference. For example, main heat transfer ribs with uniform distance over the entire circumference and possibly also with uniform thickness may thus be provided. Additional contracted heat transfer ribs, which limit the volume of the waste gas backflow space 26 to this area and thus also reduce the flow cross section, may now be provided between such main heat transfer ribs in the outlet circumferential area 48. These additional heat transfer ribs may now end in an expansion area, so that only the main heat transfer ribs are present in the axial flow area now following as well as in the entire opposite circumferential area. This aspect may, of course, also be combined with the aspect shown in FIG. 2 or even with the aspect shown in FIGS. 3a and 3b.

Regardless of how the contraction of the flow cross section is achieved in outlet circumferential area 48, it can be recognized here that the heat exchanger housing 18 can also be manufactured easily by also providing the necessary draft angles according to a die-casting process.

It is seen especially from the view in FIG. 1 that the flame tube 16 and the heat exchanger housing 18 are arranged essentially concentrically in relation to longitudinal axis L. This is not conflicted by the fact that the heat exchanger housing 18 or the circumferential wall 20 thereof is possibly pushed somewhat radially inwardly at the outlet circumferential area 48 to provide the flow contraction discussed above in order to provide the contraction recognizable in FIG. 1 and, following same axially, the stepped expansion of the expansion area 52. In the section now following the expansion area 52 in the direction of flow, the heat exchanger housing 18, which is, for example, symmetrical there in the circumferential direction, i.e., possibly mirror symmetric or point symmetric in relation to the longitudinal axis L, is now concentric with the flame tube 16 in relation to the longitudinal axis L, which makes possible an easy connection to other system areas, e.g., the burner area 12.

While specific embodiments of the invention have been shown and described in detail to illustrate the application of the principles of the invention, it will be understood that the invention may be embodied otherwise without departing from such principles.

What is claimed is:

1. A vehicle heater comprising a burner arrangement, the burner arrangement comprising:
    a combustion chamber;
    a flame tube with a waste gas outlet end area, said flame tube carrying combustion waste gases away from said combustion chamber and extending elongated in a direction of a longitudinal axis with a constant cross sectional area;
    a heat exchanger housing with a circumferential wall, which surrounds said flame tube and defines a waste gas backflow space extending essentially annularly about the longitudinal axis and with a bottom area located opposite said waste gas outlet end area of said flame tube, said heat exchanger housing having a waste gas outlet for releasing combustion waste gases from said waste gas backflow space in an outlet circumferential area of said heat exchanger housing, wherein a flow cross section provided between said flame tube and said circumferential wall in a first axial area of said waste gas backflow space is smaller in said outlet circumferential area than in a circumferential area located opposite the outlet circumferential area in relation to the longitudinal axis, and a flow cross section in said outlet circumferential area increases in an expansion area following said first axial area in an axial direction, wherein at least one of:
    a flow cross section in the outlet circumferential area in a direction of said waste gas outlet in a second axial area following said expansion area corresponds essentially to a flow cross section in an opposite circumferential area; and
    a flow cross section increases in a stepped manner in said expansion area.

2. A vehicle heater in accordance with claim 1, wherein the flow cross section in the outlet circumferential area is smallest in relation to other circumferential areas, said outlet circumferential area being defined by a first circumferential surface portion of said flame tube and a first inner circumferential surface portion of said circumferential wall, said first axial area being defined by a second circumferential surface portion of said flame tube and a second inner circumferential surface portion of said circumferential wall, said outlet circumferential area being located radially opposite said first axial area with respect to said longitudinal axis, wherein a radial distance between said first circumferential surface portion of said flame tube and said first inner circumferential surface portion of said circumferential wall is greater than a radial distance between said second circumferential surface portion of said flame tube and said second inner circumferential surface portion of said circumferential wall.

3. A vehicle heater in accordance with claim 1, wherein the flow cross section is represented by a radial distance between an outer circumferential surface of said flame tube and an inner circumferential surface of said circumferential wall, wherein the radial distance varies between said first axial area and said outlet circumferential area in a circumferential direction.

4. A vehicle heater in accordance with claim 1, wherein the flow cross section in the outlet circumferential area is smaller in a backflow space inlet area formed between said waste gas outlet end area of said flame tube and said circumferential wall than in said opposite circumferential area.

5. A vehicle heater in accordance with claim 4, wherein a radial distance between an outer circumferential surface of said flame tube and an inner circumferential surface of said circumferential wall increases in a stepped manner in an expansion area in the axial direction.

6. A vehicle heater in accordance with claim 5, wherein said radial distance between said outer circumferential surface of said flame tube and said inner circumferential surface of said circumferential wall is essentially equal in relation to the longitudinal axis of areas located opposite each other in the direction of said waste gas outlet following said expansion area.

7. A vehicle heater in accordance with claim 1, further comprising heat transfer ribs extending in an axial direction, said heat transfer ribs being provided on an inside of said heat exchanger housing facing said flame tube, wherein said flow cross section associated with said first axial area is non-uniform in a circumferential direction.

8. A vehicle heater in accordance with claim 7, wherein a circumferential distance between adjacent heat transfer ribs is smaller in said first axial area in said outlet circumferential area than in said opposite circumferential area.

9. A vehicle heater in accordance with claim 8, wherein in said expansion area, a circumferential distance between adjacent heat transfer ribs increases in said outlet circumferential area to a circumferential distance corresponding to another circumferential distance in said opposite circumferential area.

10. A vehicle heater in accordance with claim 8, wherein said flow cross section is represented by said circumferential distance between adjacent heat transfer ribs.

11. A vehicle heater in accordance with claim 1, wherein said flame tube and said heat exchanger housing are arranged essentially concentrically with the longitudinal axis.

12. A vehicle heater burner arrangement comprising:
a combustion chamber;
a flame tube with a waste gas outlet end, said flame tube carrying combustion waste gases away from said combustion chamber and extending in a direction of a longitudinal axis with a constant cross sectional area;
a heat exchanger housing with a circumferential wall, which surrounds said flame tube and defines a waste gas backflow space extending essentially annularly between said flame tube and said circumferential wall and with a bottom located opposite said waste gas outlet end of said flame tube, said heat exchanger housing having a waste gas outlet for releasing combustion waste gases from said waste gas backflow space, said waste gas outlet extending radially outwardly from said circumferential wall at a location axially spaced from said waste gas outlet end, said circumferential wall having an outlet side and an opposite side, opposite to said outlet side, said waste gas backflow space comprising:
a first axial portion adjacent to said waste gas outlet end of said flame tube, said first axial portion having an outlet side flow cross section, on said outlet side, that is smaller than an opposite side flow cross section, on said opposite side;
a second axial portion adjacent to said waste gas outlet of said heat exchanger housing, said second axial portion having an outlet side flow cross section, on said outlet side, that is larger than said outlet side flow cross section of said first axial portion; and
an expansion axial portion axially between said first axial portion and said second axial portion, said expansion axial portion having a flow cross section that expands on said outlet side from said outlet side flow cross section of said first axial portion to said outlet side flow cross section of said second axial portion.

13. A vehicle heater in accordance with claim 12, wherein a difference of flow cross section between said first axial portion and said second axial portion is based on a different radial distance between an outer circumferential surface of said flame tube and an inner circumferential surface of said circumferential wall, said first axial portion being located radially opposite said second axial portion with respect to said longitudinal axis.

14. A vehicle heater in accordance with claim 13, wherein the radial distance between said outer circumferential surface of said flame tube and said inner circumferential surface of said circumferential wall increases in an axial direction in a stepped manner in said expansion axial portion.

15. A vehicle heater in accordance with claim 12, wherein a radial distance between an outer circumferential surface of said flame tube and an inner circumferential surface of said circumferential wall is essentially equal in relation to the longitudinal axis along said second axial portion.

16. A vehicle heater in accordance with claim 12, further comprising heat transfer ribs extending in an axial direction, said heat transfer ribs being provided on an inside of said heat exchanger housing facing said flame tube.

17. A vehicle heater in accordance with claim 16, wherein a difference of flow cross section between said first axial portion and said second axial portion is based on a distance between adjacent heat transfer ribs being smaller in said first axial portion on said outlet side than in said second axial portion on said outlet side.

18. A vehicle heater in accordance with claim 16, wherein said first axial portion outlet side flow cross section is smaller than said first axial portion opposite side flow cross section based on a distance between adjacent heat transfer ribs being smaller in said first axial portion on said outlet side than in said first axial portion on said opposite side.

19. A vehicle heater in accordance with claim 16, wherein in said expansion axial portion, a circumferential distance between adjacent heat transfer ribs increases on said outlet side.

20. A vehicle heater in accordance with claim 12, wherein said flame tube and said heat exchanger housing are arranged essentially concentrically with the longitudinal axis, said first axial portion being defined by a first circumferential surface portion of said flame tube and a first inner circumferential surface portion of said circumferential wall, said second axial area being defined by a second circumferential surface portion of said flame tube and a second inner circumferential surface portion of said circumferential wall, said first axial portion being located radially opposite said second axial portion with respect to said longitudinal axis, wherein a radial distance between said first circumferential surface portion of said flame tube and said first inner circumferential surface portion of said circumferential wall is greater than a radial distance between said second circumferential surface portion of said flame tube and said second inner circumferential surface portion of said circumferential wall.

* * * * *